United States Patent
Nagano et al.

(10) Patent No.: US 8,999,054 B2
(45) Date of Patent: Apr. 7, 2015

(54) METHOD OF MANUFACTURING ALUMINUM FLAKE PIGMENT, ALUMINUM FLAKE PIGMENT OBTAINED BY THE MANUFACTURING METHOD AND GRINDING MEDIA EMPLOYED FOR THE MANUFACTURING METHOD

(75) Inventors: Keita Nagano, Nara (JP); Takao Mizoshita, Yao (JP)

(73) Assignee: Toyo Aluminium Kabushiki Kaisha, Osaka-shi (JP)

( * ) Notice: Subject to any disclaimer, the term of this patent is extended or adjusted under 35 U.S.C. 154(b) by 959 days.

(21) Appl. No.: 10/488,804

(22) PCT Filed: Sep. 5, 2002

(86) PCT No.: PCT/JP02/09068
§ 371 (c)(1),
(2), (4) Date: Mar. 4, 2004

(87) PCT Pub. No.: WO03/022934
PCT Pub. Date: Mar. 20, 2003

(65) Prior Publication Data
US 2004/0250731 A1    Dec. 16, 2004

(30) Foreign Application Priority Data
Sep. 6, 2001    (JP) .................................. 2001-270780

(51) Int. Cl.
*C09C 1/62*    (2006.01)
*B22F 1/00*    (2006.01)
(Continued)

(52) U.S. Cl.
CPC ............. *B22F 1/0055* (2013.01); *B22F 1/0007* (2013.01); *B22F 9/04* (2013.01);
(Continued)

(58) Field of Classification Search
USPC .............................. 106/404, 403, 415; 241/22
See application file for complete search history.

(56) References Cited

U.S. PATENT DOCUMENTS 3,995,815 A     12/1976   Megelas
4,049,610 A *    9/1977   Bunge et al. .................... 524/88
(Continued)

FOREIGN PATENT DOCUMENTS

EP     1080810    3/2001
GB      183134    1/1923
(Continued)

OTHER PUBLICATIONS

Chemical Abstract No. 121:17699, abstract of article by Shiozawa et al. "Applications of optically-arranged metal acrylic films for super-covering makeups", Journal of SCCJ, (1993), 27(3), 326-37.
(Continued)

*Primary Examiner* — Aileen B Felton
(74) *Attorney, Agent, or Firm* — W. F. Fasse

(57) ABSTRACT

In order to provide a method of manufacturing an aluminum flake pigment having a small mean particle size as well as high brightness, a method of manufacturing an aluminum flake pigment including a step of flaking aluminum powder in an organic solvent with a grinder having grinding media, which grinding media contain steel ball grinding media formed by spherical media consisting of a material including steel and having diameters in the range of 0.3 mm to 1.0 mm, is provided. The mean particle size ($D50_{Al}$) of this aluminum powder is preferably in the range of 1.0 to 10.0 μm. Further, this grinder is preferably a ball mill.

11 Claims, 1 Drawing Sheet

(51) Int. Cl.
*B22F 9/04* (2006.01)
*C09C 1/64* (2006.01)

(52) U.S. Cl.
CPC ............... *C09C 1/64* (2013.01); *C09C 1/646* (2013.01); *B22F 2009/043* (2013.01); *B22F 2998/00* (2013.01); *C01P 2004/61* (2013.01)

(56) References Cited

U.S. PATENT DOCUMENTS

| | | | |
|---|---|---|---|
| 4,172,720 | A | 10/1979 | Megelas |
| 4,213,886 | A | 7/1980 | Turner |
| 4,459,276 | A | 7/1984 | Nobuoka et al. |
| 4,936,913 | A * | 6/1990 | Hieda ............ 106/404 |
| 5,024,387 | A | 6/1991 | Yeh |
| 5,127,951 | A | 7/1992 | Imasato et al. |
| 5,800,607 | A * | 9/1998 | Schnaitmann et al. ....... 106/412 |
| 6,398,999 | B1 | 6/2002 | Josephy et al. |
| 6,454,847 | B1 | 9/2002 | Iri et al. |
| 6,464,769 | B2 * | 10/2002 | Chattopadhyay et al. .... 106/403 |
| 6,821,622 | B1 | 11/2004 | Clough |
| 6,863,851 | B2 | 3/2005 | Josephy et al. |
| 7,163,580 | B2 | 1/2007 | Minami |
| 7,223,476 | B2 | 5/2007 | Edwards et al. |
| 2006/0034787 | A1 | 2/2006 | Bujard |

FOREIGN PATENT DOCUMENTS

| | | |
|---|---|---|
| JP | 51-24635 | 2/1976 |
| JP | 55-500504 | 8/1980 |
| JP | 03-294360 | 12/1991 |
| JP | 05-500326 | 1/1993 |
| JP | 05-163463 | 6/1993 |
| JP | 08170034 | 7/1996 |
| JP | 09194756 | 7/1997 |
| JP | 11-106686 | 4/1999 |
| JP | 11152423 | 6/1999 |
| JP | 11-319607 | 11/1999 |
| JP | 2000-273350 | 10/2000 |
| JP | 2000-301058 | 10/2000 |
| JP | 2001-180933 | 7/2001 |
| JP | 2002126547 | 5/2002 |
| JP | 2002179421 | 6/2002 |
| WO | 91/01182 | 2/1991 |
| WO | WO/99/54074 | 10/1999 |

OTHER PUBLICATIONS

Machine translation of Japanese Patent Specification JP 11-152423A, application published Jun. 1999.
Asakura Publishing Co., Ltd., "Ganryo no Jiten (Pigment Dictionary)", First Edition, First Printing, Sep. 25, 2000, p. 443 (with partial English translation).
Toyal America, Inc., Product Information, "ATA X-81 Spherical Aluminum Powder", Jan. 1, 1997, Lockport, Illinois, 1 page.
Toyal America, Inc., Product Information, "ATA X-65 Spherical Aluminum Powder", Jan. 1, 1997, Lockport, Illinois, 1 page.
Office Action (Notice of Allowance) in Japanese Patent Application 030893/2007, mailed Jun. 8, 2010, 3 pages, with English translation thereof, 3 pages.
Ian Wheeler, "Metallic Pigments in Polymers", Rapra Technology Limited, Shawbury, UK, 1999, title page, pp. i, and 14 to 19.
Temple C. Patton, editor, "Pigment Handbook", vol. III Characterization and Physical Relationships, John Wiley & Sons, Inc., New York, USA, 1973, title page, copyright page, pp. 394 to 397, 406, 407.
EPO Communication of the Board of Appeal in European Patent Application // Patent No. 07117233.2 // 1878771, mailed Aug. 10, 2012, 7 pages.
Machine translation of Japanese Patent specification and claims of JP 2000-273350 A, original document published Oct. 2000.

* cited by examiner

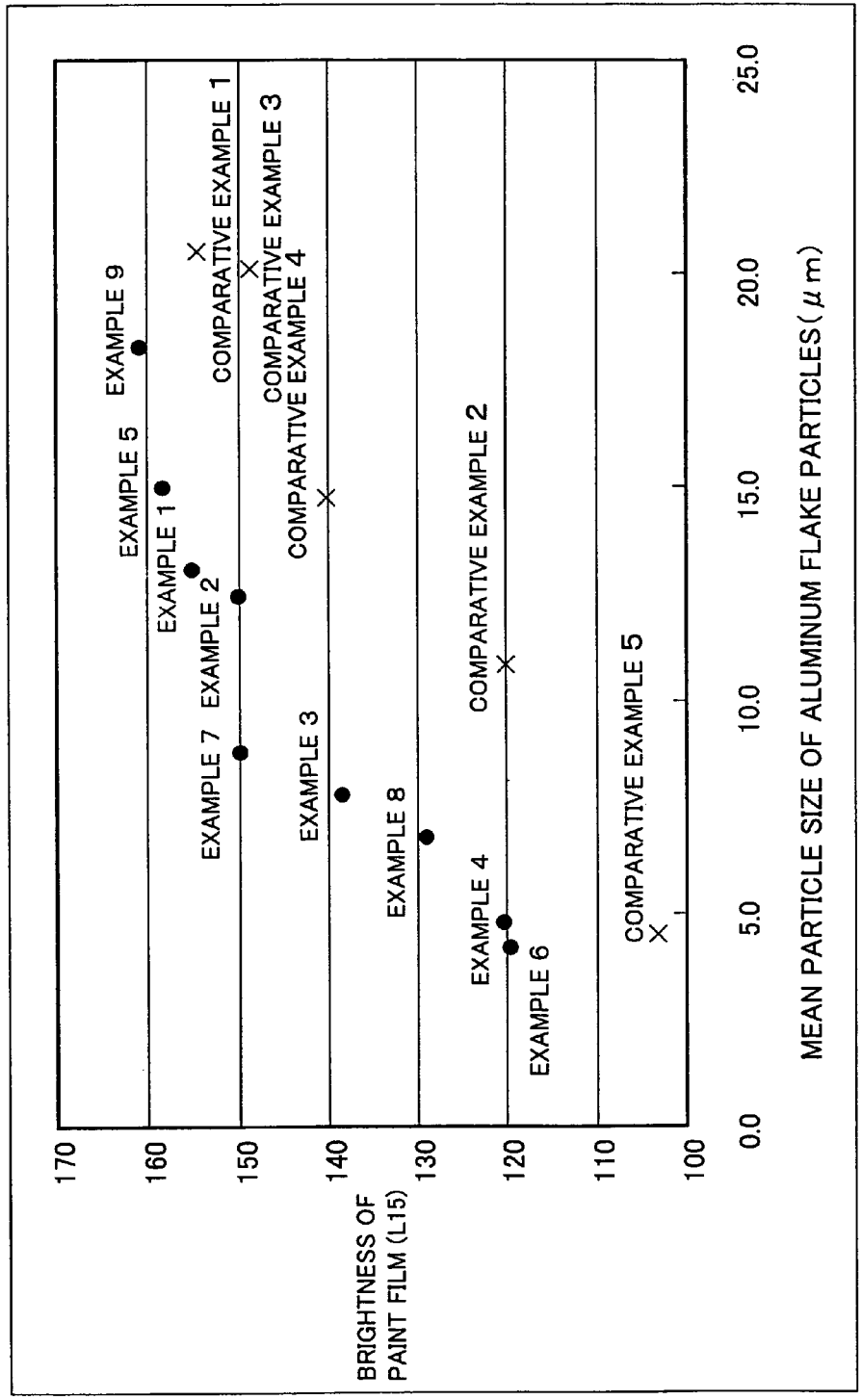

METHOD OF MANUFACTURING ALUMINUM FLAKE PIGMENT, ALUMINUM FLAKE PIGMENT OBTAINED BY THE MANUFACTURING METHOD AND GRINDING MEDIA EMPLOYED FOR THE MANUFACTURING METHOD

TECHNICAL FIELD

The present invention relates to an aluminum flake pigment employed for a high-quality metallic paint or the like and a method of manufacturing the same. More detailedly, the present invention relates to an aluminum flake pigment having extremely high brightness and denseness employed for a high-quality metallic paint composition used for automotive finish and parts, an industrial machine, furniture, a household appliance or the like, a high-quality metallic ink composition used for gravure printing, offset printing or the like and a metallic compound plastic resin composition and a method of manufacturing the same.

The present invention also relates to grinding media used in the aforementioned method of manufacturing the aluminum flake pigment.

BACKGROUND TECHNIQUE

An aluminum flake pigment is used in wide-ranging fields as a metallic pigment contained in a paint composition, an ink composition or a resin composition.

In general, the aluminum flake pigment is obtained by wet-milling aluminum powder serving as a raw material together with a grinding lubricant and an organic solvent using a grinder or pulverizer such as a ball mill or an attriter having grinding media thereby flaking the aluminum powder.

The metallic effect of a paint film mainly depends on the shape, the surface smoothness, the mean particle size, the particle size distribution, the average thickness, the thickness distribution, the aspect ratio etc. of the aluminum flake pigment, which are adjusted by a combination of the characteristics of the raw aluminum powder and grinding conditions.

While the metallic effect is visually recognized as the combination of brightness, lightness, sparkling effect and the like, there has generally been a strong tendency among demanders to desire a paint film having high brightness. In general, the brightness of the paint film and the mean particle size of the aluminum flake pigment are so correlative with each other that the brightness is increased as the mean particle size is increased.

If the aluminum flake pigment has a large mean particle size, however, the orientation of the aluminum flake pigment tends to be irregular in formation of the paint film, the aluminum flake pigment may protrude from the paint film to give seeding on the surface of the paint film, and the paint film may excessively glitter to result in an unpreferable design.

Therefore, development of an aluminum flake pigment having a small mean particle size as well as high brightness is desired, and development efforts are made in various scenes.

For example, Japanese Patent Laying-Open No. 8-170034 discloses that it is possible to provide a paint film simultaneously with strong brightness and an excellent appearance by a metallic pigment composition containing (A) 100 parts by solid weight of film-forming resin and (B) 0.1 to 30 parts by weight of an aluminum flake pigment having a mean particle size (D50) in the range of 20±5 μm, an average particle thickness (t) in the range of 0.5 to 1 μm and a gradient (n) of at least 2.7 in a Rosin-Rammler diagram.

Further, Japanese Patent Laying-Open No. 11-152423 discloses an aluminum flake pigment exhibiting high brightness and excellent circulation resistance, having an average aluminum flake thickness (t) in the range of 0.2 to 0.7 μm, a mean particle size (D50) in the range of 4 to 20 μm, an aspect ratio (D50/t) in the range of 15 to 50 and an uniformity index (n) of at least 2.4.

Also when the aluminum flake pigment disclosed in either gazette is employed, however, the requirement for an aluminum flake pigment having a small mean particle size as well as high brightness is not yet sufficiently satisfied.

DISCLOSURE OF THE INVENTION

On the basis of the aforementioned present circumstances, an object of the present invention is to provide an aluminum flake pigment having a small mean particle size as well as high brightness and a method of manufacturing the same.

Another object of the present invention is to provide grinding media used for the said manufacturing method.

In order to attain the aforementioned objects, the inventors have minutely studied the relation between the shape, the surface smoothness, the mean particle size, the particle size distribution, the average thickness, the thickness distribution, the aspect ratio etc. of an aluminum flake pigment and the brightness of a paint film containing this aluminum flake pigment. Consequently, the inventors have found that a principle factor reducing the brightness of the paint film is the presence of insufficiently flaked fine aluminum particles.

In other words, the inventors have found that the brightness is reduced if insufficiently flaked fine aluminum particles are present, also when using an aluminum flake pigment having sharp particle size distribution by adjusting the mean particle size or the aspect ratio of the aluminum flake pigment in a constant range or regulating the uniformity index (n) by a Rosin-Rammler diagram.

Therefore, the inventors have made deep consideration on the basis of the aforementioned fact to reach such an idea that the insufficiently flaked fine aluminum particles inevitably remaining in the generally known method of manufacturing an aluminum flake pigment may be further flaked in order to solve the aforementioned problem, and made deep studies. Consequently, the inventors have found that the insufficiently flaked fine aluminum particles can be further flaked by flaking aluminum powder in an organic solvent with a grinder having grinding media having a specific material, a specific shape and a specific diameter.

The inventors have further found that the effect of flaking the fine aluminum particles can be further increased by flaking aluminum powder having a specific mean particle size under specific grinding conditions.

In other words, the present invention is directed to a method of manufacturing an aluminum flake pigment including a step of flaking aluminum powder in an organic solvent with a grinder having grinding media, while the grinding media contain steel ball grinding media formed by spherical media consisting of a material including steel and having diameters in the range of 0.3 mm to 1.0 mm.

The mean particle size ($D50_{Al}$) of this aluminum powder is preferably in the range of 1.0 to 10.0 μm, and particularly preferably in the range of 1.0 to 6.0 μm. Further, the ratio ($D50_{Al}/D_B$) of the mean particle size ($D50_{Al}$) of this aluminum powder to the average diameter ($D_B$) of these steel ball grinding media is preferably in the range of 0.001 to 0.02, and particularly preferably in the range of 0.0015 to 0.008. In addition, the ratio ($W_{Al}/W_{sol}$) of the mass ($W_{Al}$(kg)) of this aluminum powder to the volume ($W_{sol}$(L)) of this organic solvent is preferably in the range of 0.1 to 0.3.

This grinder is preferably a ball mill. Further, the rotational frequency of this ball mill is preferably not more than 95% of the critical rotational frequency.

The present invention further includes an aluminum flake pigment manufactured by the aforementioned method of manufacturing an aluminum flake pigment.

Further, the present invention includes an aluminum flake pigment exhibiting a mean aspect ratio of aluminum flake particles having diameters of not more than 10 μm in the range of 8 to 20 among aluminum flake particles contained in this aluminum flake pigment. In addition, this mean aspect ratio is further preferably in the range of 9 to 15 in particular. The mean particle size of these aluminum flake particles contained in the aluminum flake pigment is preferably in the range of 3 to 20 μm.

Further, such an aluminum flake pigment can be manufactured by a method of manufacturing an aluminum flake pigment including a step of flaking aluminum powder in an organic solvent with a grinder having grinding media containing steel ball grinding media formed by spherical media consisting of a material including steel and having diameters in the range of 0.3 mm to 1.0 mm, for example.

In addition, the present invention includes steel ball grinding media formed by spherical media consisting of a material including steel and having diameters in the range of 0.3 mm to 1.0 mm.

BRIEF DESCRIPTION OF THE DRAWING

FIG. 1 is a graph showing the relation between mean particle sizes of inventive aluminum flake pigments and brightness of paint films containing these aluminum flake pigments.

BEST MODE FOR CARRYING OUT THE INVENTION

The present invention is now described in further detail by showing an embodiment.

The present invention is directed to a method of manufacturing an aluminum flake pigment including a step of flaking aluminum powder in an organic solvent with a grinder having grinding media, while the grinding media contain steel ball grinding media formed by spherical media consisting of a material including steel and having diameters in the range of 0.3 mm to 1.0 mm.

<Material, Shape and Diameter of Grinding Media>

The grinding media employed in the present invention must contain steel ball grinding media formed by spherical media consisting of a material including steel and having diameters in the range of 0.3 mm to 1.0 mm, in consideration of specific gravity and economy. However, the said steel ball grinding media formed by spherical media may not be true spherical media but may be substantially spherical media. The said grinding media particularly preferably contain steel ball grinding media having diameters in the range of 0.5 to 0.8 mm.

In order to flakily grind (referred to as flake in this specification) fine aluminum powder, it is effective to reduce the diameters of the grinding media to the range of 0.3 mm to 1.0 mm. If grinding media having diameters exceeding 1.0 mm occupy most part, the fine aluminum powder is trapped between the grinding media and this aluminum powder is hardly ground and not efficiently flaked. If grinding media having diameters of less than 0.3 mm occupy most part, on the other hand, the weight of the steel ball grinding media is so small that grinding force is deteriorated, the grinding time is too long and the aluminum powder cannot be substantially ground.

At least two types of grinding media having different diameters may be mixed with each other for preparing the said grinding media. The grinder employed in the present invention may include grinding media having diameters exceeding 1.0 mm. In other words, it is important in the inventive manufacturing method to flake aluminum powder with grinding media containing grinding media having diameters of 0.3 to 1.0 mm. The quantity of the grinding media having diameters of 0.3 to 1.0 mm may be varied with the quantity of raw aluminum powder introduced into the grinder.

<Mean Particle Size of Raw Aluminum Powder>

The mean particle size ($D50_{Al}$) of the raw aluminum powder employed in the present invention is preferably in the range of 1.0 to 10.0 μm, and more preferably in the range of 1.0 to 6.0 μm.

If the mean particle size $D50_{A1}$ exceeds 10.0 μm, the diameter of the ground aluminum flake pigment is so increased that the orientation of the aluminum flake pigment may be disarranged in formation of a paint film, the surface of the paint film may include seeding due to protrusion of aluminum flake pigment particles, and the paint film may excessively glitter to result in an unpreferable design depending on the application. If the mean particle size $D50_{A1}$ is less than 1.0 μm, on the other hand, there is such a tendency that the aluminum powder cannot be efficiently flaked and sufficient film brightness cannot be attained also when using grinding media having diameters in the range of 0.3 to 1.0 mm <Ratio of Mean Particle Size of Raw Aluminum Powder to Diameter of Grinding Media>

In the manufacturing method according to the present invention, the ratio ($D50_{Al}/D_B$) of the mean particle size ($D50_{Al}$) of the raw aluminum powder to the average diameter ($D_B$) of the steel ball grinding media is preferably in the range of 0.001 to 0.02, and more preferably in the ratio of 0.0015 to 0.008. When the value of the ratio $D50_{Al}/D_B$ is in the said range, the effect of flaking fine aluminum powder is further increased.

If the value of the ratio $D50_{Al}/D_B$ is less than 0.001, gaps between the steel ball grinding media are excessively large as compared with the raw aluminum powder and hence there is such a tendency that the raw aluminum powder is hardly efficiently flaked. If the value of the ratio $D50_{Al}/D_B$ exceeds 0.02, on the other hand, the steel ball grinding media are so excessively small for the raw aluminum powder that the raw aluminum powder cannot be efficiently ground due to insufficient grinding force correlative with the mass of each grinding medium, and there is such a tendency that unflaked fine powder of aluminum remains to reduce the brightness of the paint film.

<Ratio of Mass of Raw Aluminum Powder to Volume of Organic Solvent>

In the manufacturing method according to the present invention, the ratio ($W_{Al}/W_{sol}$) of the mass ($W_{Al}$(kg)) of the raw aluminum powder to the volume ($W_{sol}$(L)) of the organic solvent is preferably in the range of 0.1 to 0.3, and more preferably in the range of 0.14 to 0.20. If the value of the ratio $W_{Al}/W_{sol}$ is less than 0.1, the raw aluminum powder migrates due to reduction of slurry viscosity in grinding, and there is such a tendency that the raw aluminum powder cannot be uniformly ground. If the value of the ratio $W_{Al}/W_{sol}$ exceeds 0.3, on the other hand, the viscosity of the slurry in grinding is so excessively increased that movement of the grinding media is suppressed, and there is such a tendency that the raw aluminum powder cannot be uniformly flaked.

<Rotational Frequency of Ball Mill Used as Grinder>

In the manufacturing method according to the present invention, the type of the grinder is not particularly limited but a generally known grinder can be preferably used, while an attriter-type grinder comprising a rotating arm therein or a cylindrical ball mill can be preferably employed, for example. Among such grinders, it is particularly preferable to employ the cylindrical ball mill in consideration of the quality and productivity.

When employing a ball mill in the manufacturing method according to the present invention, the rotational frequency of the ball mill is preferably set to not more than 95% of the critical rotational frequency. The term "critical rotational frequency", denoting such a frequency level that balls are centrifugally fixed to the inner wall of the ball mill if the rotational frequency exceeds this level, is expressed in the following equation (1):

$$n = 1/(2\pi) \times (g/r)^{1/2} \quad (1)$$

(In the equation (1), n represents the rotational frequency (rpm), g represents gravitational acceleration (3,528,000 cm/min$^2$) and r represents the radius (cm) of the ball mill).

If the rotational frequency of the ball mill exceeds 95% of the critical rotational frequency, a pulverizing effect is so increased among grinding effects that sufficient flaking cannot be attained but large flake particles are parted into ultrafine particles, and hence there is such a tendency that the brightness of the paint film is reduced. If the rotational frequency of the ball mill approaches the critical rotational frequency, impact force resulting from collision of the grinding media is increased, and there is such a tendency that the lives of the grinding media are reduced to result in difficulty of continuous use. This is because steel balls of not more than 1 mm in diameter are generally formed with no hardened films on the surfaces thereof. It is possible to elongate the lives of the grinding media by keeping the rotational frequency of the ball mill not more than 95% of the critical rotational frequency.

<Aspect Ratio of Fine Aluminum Flake Pigment>

In the aluminum flake pigment according to the present invention, the mean aspect ratio of aluminum flake particles having diameters of not more than 10 μm contained in the aluminum flake pigment is preferably at least 8. This mean aspect ratio of the aluminum flake particles is more preferably at least 9. If this mean aspect ratio is less than 8, fine aluminum flake particles are so insufficiently flaked that the paint film is consequently rendered turbid and reduced in brightness, leading to an inferior design.

This mean aspect ratio is preferably not more than 20, and more preferably not more than 15 in particular. If this mean aspect ratio exceeds 20, bending or breakage of the aluminum flake particles results in circulation for preparing a paint film, and there is such a tendency that the so-called circulation resistance is reduced.

In the aforementioned method of manufacturing an aluminum flake pigment according to the present invention, the condition that the mean aspect ratio of aluminum flake particles having diameters of not more than 10 μm contained in the obtained aluminum flake pigment exceeds 8 is satisfied unless this manufacturing method is carried out under conditions damaging the effects of the present invention or a step damaging the effects of the present invention is added to this manufacturing method.

<Mean Particle Size of Aluminum Flake Pigment>

The mean particle size of the aluminum flake pigment according to the present invention is preferably in the range of 3 to 20 μm, and more preferably in the range of 5 to 15 μm. There is such a tendency that the brightness of the paint film is insufficient if the mean particle size is less than 3 μm, while the sparkling effect of the paint film may be unpreferably excessively enhanced if the mean particle size exceeds 20 μm.

<Other Grinding Conditions>

In the manufacturing method according to the present invention, grinding is preferably performed under the presence of a grinding lubricant. While the grinding lubricant is not particularly limited but a generally known lubricant is usable, aliphatic acid such as oleic acid or stearic acid, aliphatic amine, aliphatic amide, aliphatic alcohol, an ester compound or the like can be preferably used, for example.

The said grinding lubricant has an effect of suppressing unnecessary oxidation on the surface of the aluminum flake pigment and improving the gloss. The content of the grinding lubricant in grinding is preferably in the range of 0.1 to 20 parts by mass with respect to 100 parts by mass of the raw aluminum powder, and more preferably in the range of 0.5 to 10 parts by mass. The aluminum flake pigment may agglomerate to reduce the surface gloss of the aluminum flake pigment if the content of the grinding lubricant is less than 0.1 parts by mass, while the physical property of the paint may be reduced if the content of the grinding lubricant exceeds 20 parts by mass.

In the manufacturing method according to the present invention, the ratio of the quantity of the grinding media relative to the quantity of the raw aluminum powder in grinding is preferably in the range of 20 to 200. The productivity is reduced if the said ratio is less than 20, while the grinding time is extremely elongated and the slurry viscosity is so excessively increased during grinding that the aluminum powder cannot be efficiently ground if the said ratio exceeds 200.

While the organic solvent in grinding is not particularly limited but a generally known organic solvent is usable in the manufacturing method according to the present invention, a hydrocarbon solvent such as a mineral spirit or a solvent naphtha or an alcohol, ether or ester solvent can be used, for example. In general, a high-boiling hydrocarbon solvent is preferably used in consideration of a safety problem such as flammability to the solvent in grinding.

While the present invention is now described in more detail with reference to Examples, the present invention is not restricted to these Examples.

Example 1

40 kg of steel balls having diameters of 0.7 mm serving as grinding media, 800 g of raw aluminum powder having a mean particle size of 4.6 μm, 4 L of a mineral spirit serving as an organic solvent and 500 g of oleic acid serving as a grinding lubricant were introduced into a cylindrical ball mill of 500 mm in diameter and 180 mm in length respectively, and ground for 13 hours at a rotational frequency of 41 rpm (68% of the critical rotational frequency).

After termination of the grinding step, a slurry was washed out from the ball mill with the mineral spirit and successively passed through vibrating screens of 150 meshes, 350 meshes and 400 meshes so that the passed slurry was solid-liquid separated through a pan filter. The obtained filter cake (solid content: 85%) was thereafter introduced into a kneader mixer and kneaded for 1 hour, to obtain an aluminum flake pigment (solid content: 80%).

Inventive Examples 2 to 4 and 6 to 8, Unclaimed Examples 5 and 9, and Comparative Examples 1 to 5

Aluminum flake pigments were obtained by a method similar to that in Example 1 except the diameters of steel balls, the mean particle sizes and the applied quantities of used aluminum powder materials, the quantities of mineral spirits, the rotational frequencies and the grinding times. Tables 1 to 3 show the respective conditions.

TABLE 1

|  |  | Symbol (unit) | Example 1 | Example 2 | Example 3 | Example 4 |
|---|---|---|---|---|---|---|
| Manufacturing Conditions | Raw Aluminum Powder | $W_{Al}$(kg) | 0.8 | 0.8 | 0.8 | 0.8 |
|  |  | $D50_{Al}$(μm) | 4.6 | 3.6 | 2.1 | 1.2 |
|  | Mineral Spirit | $W_{sol}$(l) | 4.0 | 5.6 | 5.6 | 5.6 |
|  | Rotational Frequency | (rpm/% vs. critical rotational frequency) | 41/68 | 41/68 | 41/68 | 41/68 |
|  | Grinding Time | (hours) | 13 | 13 | 13 | 15 |
|  | Quantity of Steel Balls | (kg) | 40 | 40 | 40 | 40 |
|  | Diameter of Steel Balls | $D_B$(mm) | 0.7 | 0.7 | 0.7 | 0.7 |
|  |  | $D50_{Al}/D_B$ | 0.0066 | 0.0051 | 0.0030 | 0.0017 |
|  |  | $W_{Al}/W_{sol}$ | 0.200 | 0.143 | 0.143 | 0.143 |
| Performance Evaluation | Brightness of Paint Film | L15 | 155.1 | 150.0 | 138.3 | 120.2 |
|  | Mean Particle Size of Flakes | (μm) | 13.1 | 12.5 | 7.8 | 4.8 |
|  | Mean Aspect Ratio of Particles of not more than 10 μm |  | 9.4 | 9.2 | 9.0 | 8.1 |
|  | Sparkling Effect of Paint Film |  | unremarkable | unremarkable | unremarkable | no |

TABLE 2

|  |  | Symbol (unit) | *Example 5 | Example 6 | Example 7 | Example 8 | *Example 9 |
|---|---|---|---|---|---|---|---|
| Manufacturing Conditions | Raw Aluminum Powder | $W_{Al}$(kg) | 0.8 | 0.8 | 1.5 | 0.8 | 0.8 |
|  |  | $D50_{Al}$(μm) | 6.0 | 1.0 | 3.6 | 1.0 | 10.0 |
|  | Mineral Spirit | $W_{sol}$(l) | 5.6 | 5.6 | 5.0 | 5.6 | 5.6 |
|  | Rotational Frequency | (rpm/% vs. critical rotational frequency) | 41/68 | 41/68 | 41/68 | 41/68 | 41/68 |
|  | Grinding Time | (hours) | 16 | 15 | 20 | 13 | 20 |
|  | Quantity of Steel Balls | (kg) | 40 | 40 | 40 | 40 | 40 |
|  | Diameter of Steel Balls | $D_B$(mm) | 1.0 | 0.5 | 0.5 | 1.0 | 0.5 |
|  |  | $D50_{Al}/D_B$ | 0.0060 | 0.0020 | 0.0072 | 0.0010 | 0.0200 |
|  |  | $W_{Al}/W_{sol}$ | 0.143 | 0.143 | 0.300 | 0.143 | 0.143 |
| Performance Evaluation | Brightness of Paint Film | L15 | 158.3 | 119.6 | 149.8 | 129.0 | 160.7 |
|  | Mean Particle Size of Flakes | (μm) | 15.0 | 4.2 | 8.8 | 6.8 | 18.3 |
|  | Mean Aspect Ratio of Particles of not more than 10 μm |  | 9.1 | 8.0 | 9.0 | 8.1 | 8.9 |
|  | Sparkling Effect of Paint Film |  | unremarkable | no | unremarkable | no | unremarkable |

TABLE 3

|  |  | Symbol (unit) | Comparative Example 1 | Comparative Example 2 | Comparative Example 3 | Comparative Example 4 | Comparative Example 5 |
|---|---|---|---|---|---|---|---|
| Manufacturing Conditions | Raw Aluminum Powder | $W_{Al}$(kg) | 0.8 | 0.8 | 1.0 | 1.0 | 0.8 |
|  |  | $D50_{Al}$(μm) | 3.8 | 2.2 | 7.5 | 3.4 | 3.6 |
|  | Mineral Spirit | $W_{sol}$(l) | 4.6 | 4.4 | 5.0 | 6.1 | 5.6 |
|  | Rotational Frequency | (rpm/% vs. critical rotational frequency) | 49/82 | 49/82 | 41/68 | 41/68 | 41/68 |
|  | Grinding Time | (hours) | 10 | 10 | 10 | 10 | 20 |

TABLE 3-continued

|  |  | Symbol (unit) | Comparative Example 1 | Comparative Example 2 | Comparative Example 3 | Comparative Example 4 | Comparative Example 5 |
|---|---|---|---|---|---|---|---|
|  | Quantity of Steel Balls | (kg) | 40 | 40 | 50 | 50 | 40 |
|  | Diameter of Steel Balls | $D_B$(mm) | 1.2 | 1.2 | 1.5 | 1.5 | 0.2 |
|  |  | $D50_{Al}/D_B$ | 0.0032 | 0.0018 | 0.0050 | 0.0023 | 0.0180 |
|  |  | $W_{Al}/W_{sol}$ | 0.174 | 0.182 | 0.200 | 0.164 | 0.143 |
| Performance Evaluation | Brightness of Paint Film | L15 | 154.6 | 120.1 | 148.7 | 140.1 | 103.2 |
|  | Mean Particle Size of Flakes | (μm) | 20.5 | 10.8 | 20.1 | 14.8 | 4.5 |
|  | Mean Aspect Ratio of Particles of not more than 10 μm |  | 6.5 | 5.4 | 7.0 | 7.2 | 5.7 |
|  | Sparkling Effect of Paint Film |  | strong | unremarkable | strong | slightly unremarkable | no |

<Preparation of Paint Plate>

14.29 g of each of the aluminum flake pigments (metallic mass) obtained in inventive Examples 1 to 4 and 6 to 8, unclaimed examples 5 and 9, and comparative examples 1 to 5 was added to 100 g of thinner, dispersed with a glass rod and stirred/separated for 15 minutes through a paint shaker along with 80 g of A322 (acrylic clear resin by DIC) and 16.66 g of L-117-60 (melamine resin by DIC). The viscosity of the obtained paint composition was adjusted to 13.5 seconds in a ford cup with addition of thinner, to adjust a paint composition containing each of the aluminum flake pigments obtained in Examples 1 to 7 and comparative examples 1 to 5.

420 g of A345 (acrylic clear resin by DIC) and 165 g of L-117-60 (melamine resin by DIC) were added to 228 g of Solvesso 100 (aromatic solvent by Exxon Chemical), dispersed with a glass rod, and the viscosity of the mixture was thereafter adjusted to 20 seconds in a ford cup with further addition of Solvesso 100, to prepare a top coat.

The said paint compositions containing the aluminum flake pigments obtained in inventive Examples 1 to 4 and 6 to 8, unclaimed examples 5 and 9, and comparative examples 1 to 5 were spread on steel plates with an automatic spray coating machine (model 310741 by FT. LAUDERDALE) under the following conditions of application:

| [Conditions of Application] | |
|---|---|
| Traverse Dwell Time | 3 sec. |
| Flash Time for the Same Gun | 18 sec. |
| Traveling Speed of Gun | 1500 sec. |
| Index Distance | 2 |
| Time for Gun Change from Base to Top Coat | 180 sec. |
| Pass Frequency of the Same Paint (Base) | 4 passes |
| Pass Frequency of the Same Paint (Top) | 4 passes |
| Direction of Movement of Spray | L-R-L |
| Atomization Pressure | 4.0 kg/cm$^2$ |
| Discharge (Base) | 4 + 3/8R-OPEN |
| Discharge (Top) | Full Admission |
| Pattern (Base and Top) | 2R-OPEN |

Thereafter the plates having the paint compositions applied thereto were stood still for 30 minutes, and subjected to first baking under conditions of a temperature of 80° C. and a time of 5 minutes and second baking under conditions of a temperature of 140° C. and a time of 25 minutes, to obtain paint plates containing the aluminum flake pigments obtained in Examples 1 to 4 and 6 to 8, unclaimed examples 5 and 9, and comparative examples 1 to 5 respectively.

<Performance Evaluation>

The mean aspect ratios of aluminum flake particles having diameters of not more than 10 μm contained in the aluminum flake pigments obtained in Examples 1 to 4 and 6 to 8, unclaimed examples 5 and 9, and comparative examples 1 to 5 were measured. Further, L values of the said paint plates containing these aluminum flake pigments were measured with a varied angle colorimeter (MA-68 by X-Rite) at an incident angle of 45° and an offset angle of 15° from a specular direction, thereby evaluating the brightness of paint films. Sparkling effect of the paint films was also visually evaluated. Tables 1 to 3 show the results. FIG. 1 shows the relation between the mean particle sizes of aluminum flake particles contained in these aluminum flake pigments and the L values. The brightness is increased as the L value is increased.

Among the numerals in Tables 1 to 3, the mean particle sizes of the raw aluminum powder and the aluminum flake pigments were measured with a laser diffraction particle size distribution measurer (Microtrack HRA by Honeywell) under the following conditions:

(i) For Raw Aluminum Powder 0.5 g of the raw aluminum powder was mixed with 0.01 g of hexamethaphosphoric acid and the mixture was stirred with a glass rod, introduced into circulating water in a system of measurement and supersonically dispersed for 2 minutes, for thereafter measuring the mean particle size.

(ii) For Aluminum Flake Pigment 0.5 g of aluminum paste, 1.0 g of Triton x-100 (nonionic surface active agent by Union Carbide Corporation) and 5.0 g of ethylene glycol were mixed with each other and the mixture was stirred with a glass rod, introduced into circulating water in a system of measurement and supersonically dispersed for 30 seconds, for thereafter measuring the mean particle size.

The mean aspect ratio of aluminum flake particles having diameters of not more than 10 μm contained in each aluminum flake pigment was obtained by cutting the said paint plate into 1.5 cm square and smoothly polishing the surface of a sample prepared by embedding the cut paint plate into epoxy resin to be perpendicular to the sample surface thereby preparing an observation sample and observing the states of aluminum flake particles in a section of a paint film with a digital HD microscope VH-7000 (by KEYENCE). In other words, the thickness d and the major axis D of each particle were measured as to the observed flakes on a screen with Image-Pro PLUS ver. 4 (by MEDIA CYBERNETICS).

At this time, the number of aluminum flake particles having major axes D of not more than 10 μm was set to at least 50, for calculating the individual aspect ratios (D/d) of all of the employed at least 50 aluminum flake particles and regarding the mean value thereof as the mean aspect ratio of the aluminum flake particles having diameters of not more than 10 μm contained in each aluminum flake pigment.

While the major axes D observed from the section cannot necessarily be regarded as those expressing the individual major axes of the aluminum flake particles but the individual aspect ratios of the aluminum flake particles calculated on the basis thereof include more or less errors, the mean value of these individual aspect ratios was defined as the mean aspect ratio by setting the number of measurement to at least 50.

As a result of the aforementioned evaluation, the paint films employing paints containing the aluminum flake pigments manufactured by the inventive manufacturing method are remarkably high in brightness at the same mean particle size as compared with comparative examples, and inhibited from sparkling effect in regions having low mean particle sizes.

The embodiment and Examples disclosed this time are to be considered as illustrative and not restrictive in all points. The range of the present invention is indicated not by the above description but by the scope of claim for patent, and intended to include all modifications within the meaning and range as the scope of claim for patent.

INDUSTRIAL AVAILABILITY

From the aforementioned evaluation results, the aluminum flake pigment according to the present invention, which is an aluminum flake pigment exhibiting high brightness also when the mean particle size is small and inhibited from sparkling effect in a region having a low mean particle size, can be regarded as an aluminum flake pigment extremely excellent in design property.

Therefore, it is understood possible to further flake insufficiently flaked fine aluminum powder by employing a grinder having grinding media containing steel ball grinding media having diameters in the range of 0.3 mm to 1.0 mm in the method of manufacturing an aluminum flake pigment according to the present invention. Accordingly, it can be said that the method of manufacturing an aluminum flake pigment according to the present invention is a method of manufacturing an aluminum flake pigment capable of manufacturing an aluminum flake pigment having a small mean particle size as well as high brightness.

Further, the steel ball grinding media according to the present invention are steel ball grinding media formed by spherical media consisting of a material including steel and having diameters in the range of 0.3 mm to 1.0 mm, and hence it is possible to flake insufficiently flaked fine aluminum powder by employing the grinding media containing steel ball grinding media according to the present invention. Accordingly, it can be said that the steel ball grinding media according to the present invention are steel ball grinding media preferably usable when manufacturing an aluminum flake pigment having a small mean particle size as well as high brightness.

The invention claimed is:

1. A method of manufacturing an aluminum flake pigment including a step of flaking an aluminum powder to produce aluminum flakes as said aluminum flake pigment in an organic solvent with a grinder having grinding media, wherein said grinding media contain steel ball grinding media formed by spherical media comprising steel and having diameters in a range of 0.3 mm to 1.0 mm, wherein said aluminum powder has a mean particle size ($D50_{Al}$) in a range of 1.0 μm to 4.6 μm, and a ratio ($D50_{Al}/D_B$) of said mean particle size ($D50_{Al}$) of said aluminum powder to an average diameter ($D_B$) of said steel ball grinding media is in a range of 0.001 to 0.02.

2. The method of manufacturing an aluminum flake pigment according to claim 1, wherein said ratio ($D50_{Al}/D_B$) of the mean particle size ($D50_{Al}$) of said aluminum powder to the average diameter ($D_B$) of said steel ball grinding media is in the range of 0.0015 to 0.008.

3. The method of manufacturing an aluminum flake pigment according to claim 1, wherein a ratio ($W_{Al}/W_{sol}$) of the mass ($W_{Al}$(kg)) of said aluminum powder to the volume ($W_{sol}$(L)) of said organic solvent is in a range of 0.1 to 0.3.

4. The method of manufacturing an aluminum flake pigment according to claim 1, wherein said grinder is a ball mill.

5. The method of manufacturing an aluminum flake pigment according to claim 4, further consprising operating said ball mill at a rotational frequency that is not more than 95% of the critical rotational frequency.

6. The method of manufacturing an aluminum flake pigment according to claim 1, wherein said step of flaking aluminum powder produces aluminum flakes comprising aluminum flake particles that include small flake particles having maximum dimensions of not more than 10 μm, wherein said small flake particles have a mean aspect ratio in a range of 8 to 20.

7. The method of manufacturing an aluminum flake pigment according to claim 1, wherein said ratio ($D50_{Al}/D_B$) of said mean particle size ($D50_{Al}$) of said aluminum powder to said average diameter ($D_B$) of said steel ball grinding media is less than 0.004.

8. The method of manufacturing an aluminum flake pigment according to claim 1, wherein said diameters of said spherical media are not more than 0.7 mm.

9. The method of manufacturing an aluminum flake pigment according to claim 1,
wherein said step of flaking produces a slurry including said organic solvent and aluminum flakes produced by said flaking of said aluminum powder,
further comprising, after said step of flaking, a step of separating said aluminum flakes out of said slurry and then preparing said aluminum flake pigment of said aluminum flakes.

10. The method of manufacturing an aluminum flake pigment according to claim 9, wherein said step of separating said aluminum flakes out of said slurry produces a cake of said aluminum flakes, and said step of preparing said aluminum flake pigment of said aluminum flakes comprises kneading said cake of said aluminum flakes to obtain said aluminum flake pigment.

11. The method of manufacturing an aluminum flake pigment according to claim 1, wherein said step of flaking said aluminum powder produces aluminum flakes used for said aluminum flake pigment, and wherein said aluminum flakes have a mean particle size in a range of 4.2 μm to 13.1 μm.

* * * * *

UNITED STATES PATENT AND TRADEMARK OFFICE
CERTIFICATE OF CORRECTION

PATENT NO. : 8,999,054 B2  
APPLICATION NO. : 10/488804  
DATED : April 7, 2015  
INVENTOR(S) : Nagano et al.

Page 1 of 1

It is certified that error appears in the above-identified patent and that said Letters Patent is hereby corrected as shown below:

In the Specification,

Column 5,
Line 10, after "method", delete "-";

Columns 7 and 8,
Following the TABLE 2 insert --* Examples 5 and 9 are outside of the claimed range of the mean particle size $D50_{Al}$ of the raw aluminum powder.--;

In the Claims,

Column 12,
Claim 2. Line 12, replace "the mean" by --said mean--;
Line 12, replace "powder to the" by --powder to said--;
Line 14, replace "the range" by --a range--;

Claim 3. Line 16, replace "of the" by --of a--;
Line 17, replace "to the volume" by --to a volume--;

Claim 5. Line 22, replace "consprising" by --comprising--;
Line 24, replace "the critical" by --a critical--.

Signed and Sealed this
Twenty-first Day of July, 2015

Michelle K. Lee
*Director of the United States Patent and Trademark Office*